May 26, 1964     D. P. DECKER     3,134,361
BIRD FEEDER
Filed Aug. 5, 1963     2 Sheets-Sheet 1
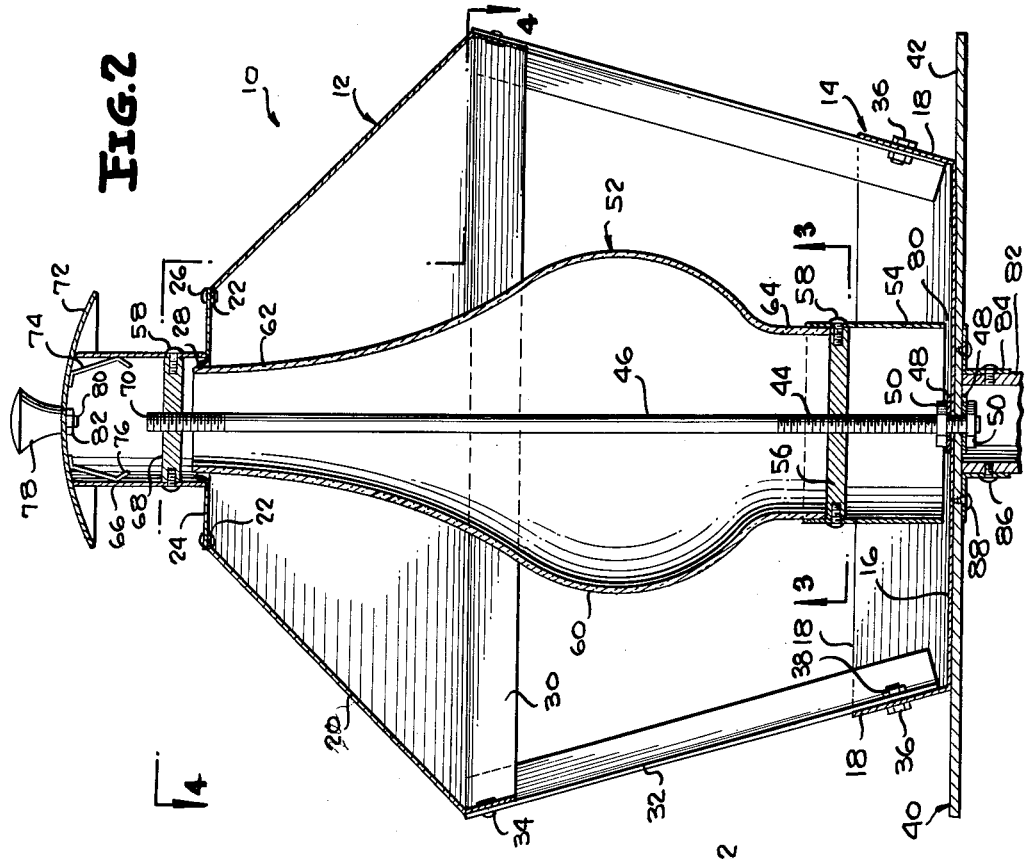
INVENTOR
DELMAR P. DECKER
BY Shoemaker and Mattare
ATTORNEYS May 26, 1964     D. P. DECKER     3,134,361
BIRD FEEDER Filed Aug. 5, 1963     2 Sheets-Sheet 2

INVENTOR
DELMAR P. DECKER

BY Shoemaker and Mattare

ATTORNEYS

United States Patent Office 3,134,361
Patented May 26, 1964

3,134,361
BIRD FEEDER
Delmar P. Decker, Shawnee, Okla.
Filed Aug. 5, 1963, Ser. No. 299,811
12 Claims. (Cl. 119—53)

This invention relates to feeding devices, and more particularly a bird feeder which automatically dispenses feed at a predetermined rate.

Briefly, the invention comprises a platform adapted to support a small quantity of bird feed for consumption, a transparent feed reservoir mounted on the platform in such a manner that it may be adjusted for dispensing feed at any desired rate, and a roof structure extending over and protecting the platform from the elements.

It is an object of this invention to provide a bird feeder which automatically operates to dispense feed and yet has no moving parts, is simple in design, is economical to manufacture, and requires a minimum of maintenance.

It is another object of the invention to provide a bird feeder which has a transparent feed reservoir whereby the quantity of the feed remaining in the reservoir can quickly and easily be determined, and the reservoir is adjustably mounted above a floor of the feeder so that the rate at which the feed is dispensed from the reservoir may be selectively varied as desired.

It is another object of the invention to provide a bird feeder which includes a novel arrangement of two coaxial cylinders adjustably mounted on a single supporting rod which permits parts of the bird feeder to be adjusted and facilitates quick disassembly of the feeder for storage or for replacement of parts.

It is still another object of this invention to provide a bird feeder which may be quickly and easily filled or refilled with feed.

It is yet another object of this invention to provide a bird feeder which is composed of durable and non-corrosive parts, and yet is pleasing in appearance.

The invention will be best understood from a consideration of the following detailed description taken in connection with the accompanying drawings, wherein:

FIGURE 1 is a perspective view of the invention;

FIGURE 2 is an enlarged vertical cross sectional view taken substantially on the plane of line 2—2 of FIGURE 1;

FIGURE 3 is a horizontal cross sectional view taken substantially on the plane of line 3—3 of FIGURE 2;

Figure 5:
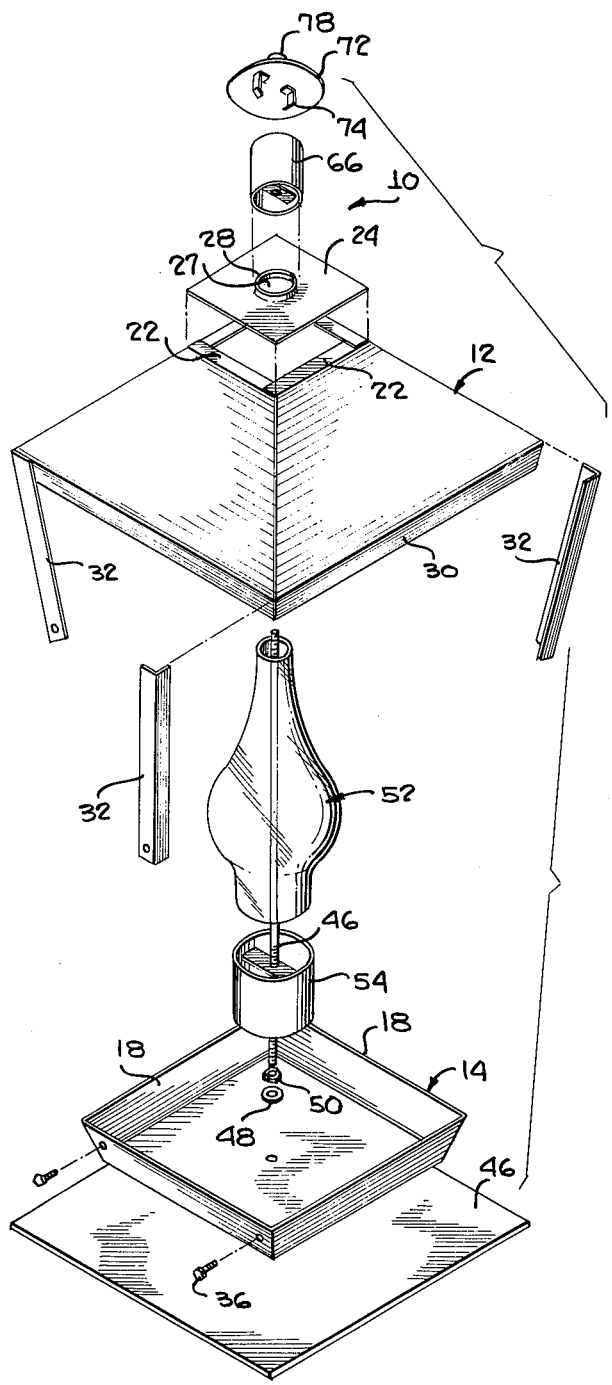
FIGURE 5 is an exploded perspective view of the invention.
Figure 4:
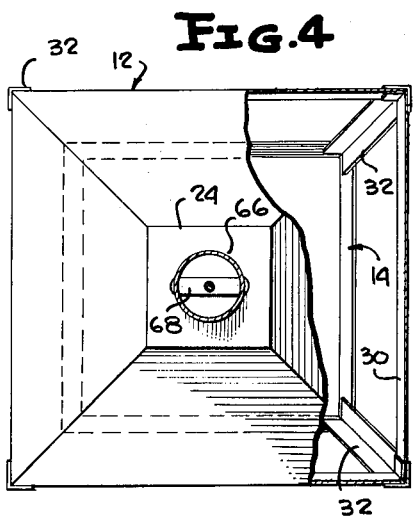
FIGURE 4 is a reduced cross sectional view taken substantially on the plane of line 4—4 of FIGURE 2.

As shown in the drawings wherein identical reference numerals throughout the various figures indicate the same parts, the bird feeder 10 includes a roof or hood 12 mounted in spaced relationship above a pan 14, and both of which are of rectangular shape in plan. Preferably, the roof and pan are of square shape in plan.

The pan 14 may be formed from an integral sheet of metal and includes a square floor 16 integrally connected to four side flanges 18 which are inclined upwardly and outwardly from the floor.

The roof 12 is composed of four equal size plates 20 having a trapezoidal shape and secured at their edges so as to form a rigid leakproof structure having a square opening in the center thereof defined by coplanar flanges 22 which are overlapped by the edges of a square roof plate 24. Roof plate 24 is secured to flanges 22 by means of rivets 26. A circular opening 27 is formed in the center of the roof plate and preferably defined by an annular flange 28 integral with the roof plate.

The edges of the trapezoidal plates 20 may be welded together, or the plates may be formed with overlapping side flanges riveted together. The lower edge of each plate 20 has integrally formed therewith a downwardly and inwardly sloping flange 30. The ends of the flanges 30 abut one another to form corners which are overlapped by the upper ends of legs 32 which are angular or L-shaped in cross section. The upper ends of the legs are secured to the flanges 30 by rivets 34. The lower ends of the legs 32 extend downwardly and internest within the corners defined by the abutting ends of the side flanges 18. As shown clearly in FIGURE 2, the lower ends of legs 32 are removably secured to flanges 18 by bolts 36 extending through aligned bores and nuts 38 threaded on the bolts.

Pan 14 is centered in relation to and supported on a square base 40 which has edge portions 42 projecting outwardly beyond the pan. The centers of the pan and base have aligned bores which receive the threaded end 44 of a vertical center rod 46. Base 42 and pan 14 are rigidly and removably secured together by a pair of washers 48 and a pair of nuts 50 threaded on end 44 as illustrated in FIGURE 2.

A reservoir comprising a transparent glass globe 52 and a feed cylinder 54 are adjustably mounted on the threaded end 44 of rod 46 by means of a support bar 56 extending diametrically across an upper portion of cylinder 54 and having a central bore threaded on the threaded end 44. Bar 56 is fixed to the feed cylinder 54 by means of a plurality of screws 58 extending through bores in the cylinder and threaded into the ends of the bar. As shown in FIGURES 2, 3 and 5, the globe 52 is circular in cross section and comprises an enlarged substantially spherical central portion 60 merging gradually with a tubular upper end 62 and connected to a lower cylindrical flange 64 which is slidably and telescopically received within the upper portion of feed cylinder 54 so as to be supported on the upper surface of bar 56. The upper tubular end 62 of globe 52 slidably extends through annular flange 28.

As shown in FIGURES 2 and 5, a filling cylinder 66 snugly receives the annular flange 28 and extends over the upper ends of globe 52 and rod 46. A top bar 68 extends diametrically across a lower portion of cylinder 66 and is secured thereto by screws 58 extending through bores in the cylinder and threaded into the bar. The center of bar 68 is provided with a threaded bore which receives the upper threaded end 70 of rod 46.

A dome shaped circular lid 72 extends over the open top of cylinder 66 and is fractionally attached thereto by a plurality of downwardly extending spaced clips or legs 74 which are welded to the under surface of the lid and the lower ends of the legs are provided with inwardly canted cam flanges 76. A knob 78 is secured to the top center of lid 72 by threaded extension 80 and a nut 82 threaded on the extension. Lid 72 and cylinder 66 function to cover the opening 27 and thereby constitute part of the roof.

In use, the globe 52 is normally filled or substantially filled with a suitable bird feed such as sunflower seeds. This feed flows downwardly by gravity where it is exhausted through an annular slot 80 onto the exposed surface of floor 16. Thus, any birds perching on the edge portions 42 or the side flanges 18 may easily consume the feed on floor 16, and as the food is consumed, replacement feed automatically flows through slot 80. In order for the bird feeder 10 to properly function with different types of bird feed, it is often necessary to vary the size of slot 80. This is easily accomplished by merely rotating feed cylinder 54 and bar 56 on the threaded portion 44 of rod 46 since this causes cylinder 54 to be moved either towards or away from floor 16. As cylinder 54 is rotated relative to bar 46, globe 52 moves up or down with the cylinder, and the upper end of the globe slides within the annular flange 28.

To refill the globe 52 with feed, it is only necessary to grasp knob 78 and remove lid 72 from cylinder 66 whereupon feed may be easily poured into globe 52 by means of its tubular part 62. The lid is then replaced on cylinder 66 and held in place by clips 74 which resiliently engage the inner surface of cylinder 66 and by frictional contact secure the lid in position.

To replace the globe 52 or to disassemble the bird feeder 10, it is only necessary to unscrew cylinder 66 and bar 68 from the end of rod 46 and separate roof 12 from pan 14 by removing bolts 36. The globe may then be lifted easily upwardly out of feed cylinder 54 and a new one installed in its place, or the globe may be cleaned and then replaced. Rod 46 may be easily separated from pan 14 by unscrewing nuts 50, and then cylinder 54 may be screwed off the end of rod 46.

The feeder 10 may be secured to the upper end of a supporting post 82 by means of a pair of L-shaped angle brackets 84 removably secured to the post and the bottom of base 42 by means of screws 86 and 88. The globe 52, knob 78 and base 42 are preferably composed of glass, chrome plated metal, and Masonite respectively. The remainder of the bird feeder is preferably composed of aluminum. Base 42 and the aluminum parts of the bird feeder are preferably painted black, although they may be painted any desired color.

If desired, the bolts 36 could be eliminated and the lower ends of legs 32 could extend into recesses or notches in floor 16 whereupon by snugly screwing cylinder 66 and bar 68 downwardly on plate 24, the legs would be retained in these recesses thereby maintaining the feeder in assembled relationship.

Inasmuch as various changes may be made in the form, location and relative arrangement of the several parts without departing from the essential characteristics of the invention, it will be understood that the invention is not to be limited except by the scope of the appended claims.

I claim:

1. A bird feeder comprising a substantially horizontally extending base, a feeder reservoir above said base having a substantially vertical passage extending therethrough, an elongated support member secured to said base and extending upwardly through said vertical passage, said reservoir comprising an open ended feed cylinder above said base, a support bar extending diametrically across said feed cylinder and secured thereto, a transparent open ended globe extending above said feed cylinder in vertical alignment therewith and having a bottom portion contacting said support bar so that the weight of said globe is supported on said support bar, adjusting means connecting said support bar to said support member so that a bottom edge of said feed cylinder may be adjustably spaced from said base to control the flow of feed from said reservoir, and a roof above said reservoir supported on said base including a cylinder having a transverse bar secured thereto for receiving an upper end of said elongated support member for retaining said globe between said bars.

2. A bird feeder comprising a substantially horizontally extending base, a feed reservoir above said base having a substantially vertical passage extending therethrough, an elongated support member secured to said base and extending upwardly through said vertical passage, said reservoir comprising an open ended feed cylinder above said base, a support bar extending diametrically across said feed cylinder and secured thereto, a transparent open ended globe above said feed cylinder in vertical alignment therewith and having a bottom portion contacting said support bar so that the weight of said globe is supported on said support bar, adjusting means connecting said support bar to said support member so that a bottom edge of said feed cylinder may be adjustably spaced from said base to control the flow of feed from said reservoir, and a roof above said reservoir supported on said base.

3. A bird feeder as defined in claim 2 wherein the bottom end of said globe telescopes within the upper end of said feed cylinder and said adjusting means comprises threads within a bore through said support bar mating with threads on a portion of said elongated support member extending through said bore.

4. A bird feeder as defined in claim 2 wherein said roof is secured to said base by support means exterior of said reservoir and has a central opening therethrough through which an upper end of said globe slidably extends so that edges of said opening may contact said globe upper end and prevent lateral movement and tilting of said globe relative to said base.

5. A bird feeder as defined in claim 4 wherein said support member extends upwardly beyond the upper end of said globe and is connected to said roof so that said roof prevents lateral movement and tilting of said support member relative to said base.

6. A bird feeder as defined in claim 2, wherein said globe extends through an opening in said roof, said roof including a filling cylinder thereon around said opening and around the upper end of said globe, a diametrical bar extending across and secured to said filling cylinder, the upper end of said elongated member being adjustably threaded through a bore in said diametrical bar so as to adjustably hold said filling cylinder in snug engagement with said roof.

7. A bird feeder as defined in claim 6, wherein said roof has a flat central portion with a circular flange defining said opening and extending upwardly into said filling cylinder.

8. A bird feeder as defined in claim 7, wherein said roof includes a substantially horizontally extending cover, said cover extending over the upper end of said filling cylinder, and releasable means frictionally securing said cover to said filling cylinder.

9. A bird feeder as defined in claim 8, wherein said releasable means comprises a plurality of spring clips secured to said cover and frictionally engaging the inside surface of said filling cylinder.

10. A bird feeder as defined in claim 7, wherein said roof is a hip roof and includes four trapezoidal panels sloping downwardly from said flat central portion.

11. A bird feeder as defined in claim 10, wherein said base includes a pan having upwardly extending flanges around its edges, legs secured to and extending between said flanges and trapezoidal panels.

12. A bird feeder as defined in claim 11, wherein said base further includes a flat plate secured to the bottom of said pan and having peripheral edge portions projecting beyond said flanges.

References Cited in the file of this patent

UNITED STATES PATENTS

| | | |
|---|---|---|
| 1,027,881 | Mills | May 28, 1912 |
| 2,344,367 | Pueschel | Mar. 14, 1944 |
| 2,438,080 | Van Meeteren | Mar. 16, 1948 |
| 2,591,126 | Breck | Apr. 1, 1952 |
| 2,866,435 | Blazier | Dec. 30, 1958 |
| 2,933,062 | Geerlings | Apr. 19, 1960 |